United States Patent
Johnsson et al.

(10) Patent No.: US 10,348,601 B2
(45) Date of Patent: Jul. 9, 2019

(54) METHODS AND ARRANGEMENTS FOR ACTIVE MEASUREMENTS

(71) Applicant: TELEFONAKTIEBOLAGET LM ERICSSON (PUBL), Stockholm (SE)

(72) Inventors: Andreas Johnsson, Uppsala (SE); Christofer Flinta, Stockholm (SE); Karl-Åke Persson, Järfälla (SE); Arne Norefors, Stockholm (SE); Johan Granath, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 144 days.

(21) Appl. No.: 15/509,579

(22) PCT Filed: Sep. 15, 2014

(86) PCT No.: PCT/SE2014/051059
§ 371 (c)(1),
(2) Date: Mar. 8, 2017

(87) PCT Pub. No.: WO2016/043633
PCT Pub. Date: Mar. 24, 2016

(65) Prior Publication Data
US 2017/0289011 A1 Oct. 5, 2017

(51) Int. Cl.
H04L 12/26 (2006.01)
H04L 29/06 (2006.01)
H04W 24/08 (2009.01)

(52) U.S. Cl.
CPC .............. H04L 43/12 (2013.01); H04L 43/10 (2013.01); H04L 43/50 (2013.01); H04L 69/16 (2013.01); H04W 24/08 (2013.01)

(58) Field of Classification Search
CPC ......... H04L 43/50; H04L 69/16; H04L 43/10; H04W 24/06; H04W 24/08; H04W 43/12
See application file for complete search history.

(56) References Cited

U.S. PATENT DOCUMENTS

2012/0128000 A1* 5/2012 Baillargeon ............ H04L 43/10
  370/392
2014/0056234 A1* 2/2014 Hedlund ............... H04W 24/02
  370/329

FOREIGN PATENT DOCUMENTS

EP    2267945 A1   12/2010
EP    2685668 A1   1/2014

OTHER PUBLICATIONS

Morton, et al., Draft Reporting Metrics: Different Points of View draft-ietf-ippm-reporting-metrics-05, Jul. 7, 2011.
(Continued)

Primary Examiner — Omer S Mian
(74) Attorney, Agent, or Firm — Patent Portfolio Builders, PLLC (57) ABSTRACT

A method for managing active measurements for determining performance parameters in a communication network comprises obtaining of a maximum permitted subsession duration and obtaining of time margins. The method further comprises determining whether or not a critical resource involved in the active measurement is active due to other activities than active measurements. If the determination concluded that the critical resource is active, a sending of an ensemble of packets of a subsession of an active measurement session is initiated. If there is an intended next subsession of the active measurement session and if a time since a last ensemble of packets was sent exceeds a sleep-init time comprised in the time margins, at least the determining and, if permitted, the initiating a sending of an ensemble of packets of the next subsession of the active measurement session is repeated.

18 Claims, 6 Drawing Sheets

(56) References Cited

OTHER PUBLICATIONS

Chimento, et al., Defining Network Capacity, RFC 5136, Feb. 2008.
Telecommunication Standardization Sector of International Telecommunication Union, ITU-T Y.1540, Series Y: Global Information Infrastructure, Internet Protocol Aspects and Next-Generation Networks Internet protocol aspects—Quality of service and network performance, Internet protocol data communication service—IP packet transfer and availability performance parameters, Appendix VIII—IP-layer capacity framework, Mar. 2011.
Shalunov, et al., A One-way Active Measurement Protocol (OWAMP), RFC 4656, Sep. 2006.
Hedayat, et al., A Two-Way Active Measurement Protocol (TWAMP), RFC 5357, Oct. 2008.
Iperf definition from Wikipedia, http://en.wikipedia.org/wiki/Iperf.
Morton, et al., Two-Way Active Measurement Protocol (TWAMP) Reflects Octets and Symmetrical Size Features, RFC 6038, Updates 5357, Standards Track, Oct. 2010.
Alcatel-Lucent, The LTE Network Architecture—A comprehensive tutorial, Strategic White Paper, 2009.
Ali-Yahiya, Understanding LTE and its Performance, 2011.
Wake-on-LAN, http://en.wikipedia.org/wiki/Wake-on-LAN, Apr. 29, 2014.
Wake-on-LAN, http://wiki.wireshark.org/WakeOnLAN, Apr. 29, 2014.
3GPP TS 23.401 V12.1.0, 3rd Generation Partnership Project; Technical Specification Group Services and System Aspects; General Packet Radio Service (GPRS) enhancements for Evolved Universal Terrestrial Radio Access Network (E-UTRAN) access (Release 12), Jun. 2013.
Office Action in application No. 14786380.7 dated Mar. 9, 2018; 4 pages.

\* cited by examiner

METHODS AND ARRANGEMENTS FOR ACTIVE MEASUREMENTS

This application is a 371 of International Application No. PCT/SE2014/051059, filed Sep. 15, 2014, the disclosure of which is fully incorporated herein by reference.

TECHNICAL FIELD

The proposed technology generally relates to communication network managing, and in particular to methods and devices for managing active measurements for determining performance parameters in a communication network.

BACKGROUND

Active measurements or active probing has long been an accepted method for determining performance parameters of communication networks, e.g. packet-switched networks. The basic concept is to transmit probe packets from a sender towards a receiver. Each probe packet is time stamped on both sides.

The measurement endpoint (MEP) and measurement intermediate point (MIP) functionality and capabilities depends on the network technology deployed. For an Internet Protocol (IP) network the MEP functionality is typically based on Internet Engineering Task Force (IETF) Two-Way Active Measurement Protocol (TWAMP), IETF Internet Control Message Protocol (ICMP) or the proprietary Cisco Service Level Agreement (SLA) protocol. For Ethernet and MultiProtocol Label Switching (MPLS) networks the MEP and MIP functionality can be based on ITU-T Y1731. For MPLS-Transport Profile (MPLS-TP), MIP and MEP functionality may also be based on IETF RFC 6371.

The above technologies are capable of measuring performance metrics such as one-way delay, round-trip time, loss, jitter and throughput. Further, extensions to TWAMP enable estimation of available path capacity.

In IP networks many operators often rely on Iperf. This is a tool for measuring mainly Transmission Control Protocol (TCP) throughput. It also reports on jitter, round-trip times and loss. The tool is to some extent a de-facto standard among network operators.

The IETF IP Performance Metrics (IPPM) working group has defined two IP active measurement protocols: One-Way Active Measurement Protocol (OWAMP) and Two-Way Active Measurement Protocol (TWAMP). OWAMP is designed for measuring one-way packet delay and one-way packet loss between two hosts. TWAMP is based on OWAMP. TWAMP is designed for measuring one-way and two-way (round-trip) packet delay and packet loss between two hosts.

The standard TWAMP consists of two protocols: the TWAMP control protocol and the TWAMP test protocol. The TWAMP control protocol is used to initiate, start and stop TWAMP test sessions. The TWAMP test protocol is used to exchange TWAMP test packets between two TWAMP hosts or endpoints. Test sessions can also be configured without the TWAMP control protocol and this is known as TWAMP light.

The standard TWAMP measurement architecture is usually comprised of only two types of hosts with specific roles. This is known as the two-host implementation. One host plays the role as the control-client and session-sender and the other host plays the role as the server and the session-reflector. The host that initiates the TWAMP control TCP connection takes the roles of the control-client and session-sender. The host that acknowledges the TWAMP control TCP connection accepts the roles of the server and session-reflector. In real-life network deployment, each host may participate in several active sessions at the same time, both as control-client/session-sender and server/session-reflector.

In a TWAMP test session, packets are time stamped, tagged with sequence numbers and transmitted from a session-sender to a session-reflector. The session-reflector time stamps the incoming packets, creates new test packets (one packet is created for each test packet received by the session-reflector) and sends them to the session-sender as soon as possible. Using these time stamps and sequence numbers, the session-sender can then calculate the one-way delay, jitter and packet loss for the session in both the forward path and the reverse path.

Figure 1:
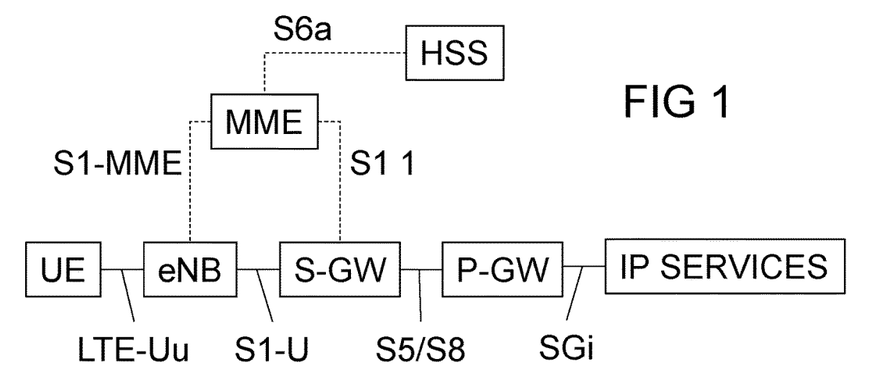
FIG. 1 is an illustration of an EPS network elements and associated interfaces.

FIG. 1 illustrates the Evolved Packet System (EPS) network elements along with the interface names. The EPS consists of two main parts; the Evolved Universal Terrestrial Radio Access Network (E-UTRAN) which is the wireless access network, i.e. the set of all E-UTRAN Node B (eNB) elements, and the Evolved Packet Core (EPC) network which corresponds to the rest of the network elements. The EPS elements thus provides access control and security, routing and forwarding, mobility management, radio resource management and network management.

Below is a short overview of what each element is responsible for:

eNB provides Long-Term Evolution (LTE) radio access via the LTE-Uu interface to the user equipment (UE). As part of this activity it manages the radio resources such as the radio bearer.

E-UTRAN Node B (eNB) is connected to the Serving GateWay (S-GW) via the S1-U interface. S-GW routes and forwards user data packets. The S-GW is further connected to the Packet data network GateWay (P-GW) via the S5/S8 interface. P-GW is the router that connects the EPC to other packet-based networks such as the Internet, illustrated as IP services in FIG. 1, over the SGi interface The Mobility Management Entity (MME) is the control node for the radio access network. It keeps track of idle UEs, it is involved in bearer activation and deactivation and is also responsible for selecting which S-GW to use. The MME is connected to the eNBs via the S1-MME interface and to the S-GW via the S11 interface.

The Home Subscriber Server (HSS) is a centralized entity holding user-related information. The HSS is connected to the MME via the S6a interface.

To manage the sparse radio resources in an efficient way the radio bearers connecting the UE to the eNB can be released during periods of inactivity. This also reduces the power consumption in the UE. When the radio bearers are inactivated, the UE is put in idle state. The MME keeps track of the UE and inactivated radio bearers during the idle state.

When data is available for the idle UE, the MME finds the UE by paging the eNBs. The UE is moved to the connected state, the UE-related information is re-created in the E-UTRAN and the radio bearers are re-established. This is called the idle-to-active transition. A similar process takes place for the case when the idle UE has data to send to the network.

Each radio bearer is associated with a Quality of Service (QoS) Class Identifier (QCI) spanning from 1 (high priority) to 9 (low priority) that is determined for the type of communication between the UE and another endpoint. More information can be found in high-level prior art descriptions.

Wake-on-LAN (Local Area Network) is an Ethernet technology that allow nodes to be activated from a sleep mode by so called magic packets. If the node is turned off, or in a sleep mode, only the Network Interface Card (NIC) is listening on the Ethernet port, in low-power mode, hence the power consumption is reduced.

The magic packet is broadcasted on layer 2 of the Open Systems Interconnection (OSI) model and contains the Media Access Control (MAC) address of the node to be woken up. The NIC of a node in sleep mode that is part of the broadcast domain listens to the magic packet. The NIC triggers the powering up process if the MAC address equals the node MAC address string. That is the NIC signals the power supply or motherboard of the node to start the wakeup process.

The functionality is specified and implemented for both wired and wireless Ethernet networks.

Operators often want to measure the performance in their networks to assess quality of service, to do fault management or just measure trends to deliver high-quality services to their customers. One way to measure the end-to-end performance is to utilize active measurement protocols such as TWAMP at the IP layer or Y.1731 for Ethernet layer networks.

One approach in EPS is to deploy a TWAMP controller in the UE and initiate sending of ensembles of packets of TWAMP packets towards a centrally located TWAMP reflector. The reflector timestamps each packet and then return it to the source. This approach requires extensive management control of the UE and hence only a limited set of UEs can actually be used for performance monitoring. One of the management problems in this scenario is that the measurement data has to be stored in the UE and then later transported to an operator-controlled node. This further increases the load on the UE.

Another approach is to do the opposite by deploying simple reflectors in the UE. In this case the operator has full control of the active measurement sessions to be started and stopped, i.e. when to initiate sending of ensembles of packets of TWAMP sessions. Further, due to the design of TWAMP, if that specific protocol is used, all measurement data is readily available in the operator network during and after the measurement session.

One issue with active measurements is that the ensembles of packets that are sent through over the links and from, to and through elements in the paths of the network contributes to the activity level of the network. In particular, the periods of idle or sleep modes tend to be reduced. An opened or maintained radio bearer drains battery from the UE as well as increasing the signaling overhead in the E-UTRAN. This is in addition to the cost of injecting measurement traffic into the network.

SUMMARY

It is an object to provide methods and devices which enables active measurements between two nodes in a network with reduced impact on the idle or sleep mode periods.

This and other objects are met by embodiments of the proposed technology.

According to a first aspect, there is provided a method for managing active measurements for determining performance parameters in a communication network. The method comprises obtaining of a maximum permitted subsession duration and obtaining of time margins. The time margins comprise at least a sleep-init time. The method further comprises determining whether or not at least a critical resource involved in the active measurement is active due to other activities than active measurements. If the determination concluded that of said at least a critical resource involved in the active measurement is active due to other activities than active measurements, a sending of an ensemble of packets of a subsession of an active measurement session is initiated. The subsession has a duration less than the maximum permitted subsession duration. If there is an intended next subsession of the active measurement session and if a time since a last ensemble of packets was sent exceeds the sleep-init time, at least the determining and, if permitted, the initiating a sending of an ensemble of packets of the next subsession of the active measurement session is repeated.

According to a second aspect, there is provided a communication network node configured for managing active measurements for determining performance parameters, comprising an input, an output, a processor and a memory. The memory comprises instructions executable by the processor, whereby the processor is operative to obtain a maximum permitted subsession duration and to obtain time margins. The time margins comprise at least a sleep-init time. The memory comprises further instructions executable by the processor, whereby the processor is further operative to determine whether or not at least a critical resource involved in the active measurement is active due to other activities than active measurements. The memory comprises further instructions executable by the processor, whereby the processor is further operative to initiate, if the determination concluded that the at least a critical resource involved in the active measurement is active due to other activities than active measurements, a sending of an ensemble of packets of a subsession of an active measurement session. The subsession has a duration less than the maximum permitted subsession duration. The memory comprises further instructions executable by the processor, whereby the processor is further operative to repeat, if there is an intended next subsession of the active measurement session and if a time since a last ensemble of packets was sent exceeds the sleep-init time, at least the determining and, if permitted, the initiating of a sending for a subsession of an ensemble of packets of the next subsession of the active measurement session.

According to a third aspect, there is provided a communication network node configured for managing active measurements for determining performance parameters. The network node comprises a first obtaining module for obtaining a maximum permitted subsession duration and a second obtaining module for obtaining time margins. The time margins comprises at least a sleep-init time. The network node further comprises a determining module for determining whether or not at least a critical resource involved in the active measurement is active due to other activities than active measurements. The network node further comprises an initiating module for initiating, if the determining module concluded that the at least a critical resource involved in the active measurement is active due to other activities than active measurements, a sending of an ensemble of packets of a subsession of an active measurement session. The subsession has a duration less than the maximum permitted subsession duration. The network node further comprises a repeating module for repeating, if there is an intended next subsession of said active measurement session and if a time since a last ensemble of packets was sent exceeds the sleep-init time, at least the determining and, if permitted, the initiating of a sending of an ensemble of packets of said next subsession of the active measurement session.

According to a fourth aspect, there is provided a computer program, residing in a memory. The computer program comprises program code, which when executed by a processing circuitry causes the processing circuitry to obtain a maximum permitted subsession duration and to obtain time margins. The time margins comprise at least a sleep-init time. The computer program comprises further program code, which when executed by a processing circuitry causes the processing circuitry further to determine whether or not at least a critical resource involved in the active measurement is active due to other activities than active measurements. The computer program comprises further program code, which when executed by a processing circuitry causes the processing circuitry further to initiate, if the determination concluded that said at least a critical resource involved in the active measurement is active due to other activities than active measurements, a sending of an ensemble of packets of a subsession of an active measurement session. The subsession has a duration less than the maximum permitted subsession duration. The computer program comprises further program code, which when executed by a processing circuitry causes the processing circuitry further to repeat, if there is an intended next subsession of said active measurement session and if a time since a last ensemble of packets was sent exceeds the sleep-init time, at least the determining and, if permitted, the initiating of a sending of an ensemble of packets of said next subsession of the active measurement session.

According to a fifth aspect, there is provided a computer program product, comprising a computer-readable medium on which a computer program is stored. The computer program comprises program code, which when executed by a processing circuitry causes the processing circuitry to obtain a maximum permitted subsession duration and to obtain time margins. The time margins comprise at least a sleep-init time. The computer program comprises further program code, which when executed by a processing circuitry causes the processing circuitry further to determine whether or not at least a critical resource involved in the active measurement is active due to other activities than active measurements. The computer program comprises further program code, which when executed by a processing circuitry causes the processing circuitry further to initiate, if the determination concluded that said at least a critical resource involved in the active measurement is active due to other activities than active measurements, a sending of an ensemble of packets of a subsession of an active measurement session. The subsession has a duration less than the maximum permitted subsession duration. The computer program comprises further program code, which when executed by a processing circuitry causes the processing circuitry further to repeat, if there is an intended next subsession of said active measurement session and if a time since a last ensemble of packets was sent exceeds the sleep-init time, at least the determining and, if permitted, the initiating of a sending of an ensemble of packets of said next subsession of the active measurement session.

An advantage of the proposed technology is a mechanism to lower the impact from active measurements by introducing an active measurement admission control system.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

One issue with active measurements from a controller in the network towards a reflector in the UE is that such measurements will open the radio bearer if it is not already open. An opened radio bearer drains battery from the UE as well as increasing the signaling overhead in the E-UTRAN. That is, if the radio bearer is not open, the active measurements introduce additional costs for the operator as well as for the end user.

Note that the number of radio bearer establishments during busy hours is in the order of 10 per hour and UE. This number increases radically if active measurements are allowed to open radio bearers.

The above discussion is easily translated to a wake-on-LAN embodiment. That is, waking up a PC just for active measurements may increase overhead in the network and will consume additional resources in terms of energy consumption in the PC.

Therefore, the technology presented herein describes a feature for ensuring that active measurements between two nodes in a network, for example a UE and a network element in the telecommunication network, only are performed when all elements and links in the path, e.g. the LTE radio bearer, are active.

If the network does not deploy this type of solutions the UE will be drained from battery due to active measurements and the E-UTRAN will need to setup bearers just for active measurements.

Further, the technology presented herein describes a specific method of classifying the active measurement results performed in an EPS based on the radio bearer QoS Class Identifier (QCI).

The technology presented herein describes a mechanism to lower the impact from active measurements by introducing an active measurement admission control system. The admission control is based on signaling overhead tradeoffs and the usage of scarce resources in the network such as the LTE radio in the EPS. Also the power consumption of nodes is critical, both in the LTE radio scenario but also for a wake-on-LAN case.

In this detailed description the ideas are described using two embodiments, one that is EPS specific and one briefer that exemplifies using wake-on-LAN. However, the general approach is not limited to these particular examples.

Note that the presented idea as such is generalizable to active measurement admission control, e.g. at the packet level, of any network where activation and deactivation of links and network elements (NE) are dependent of the user and/or network activity.

Figure 2:
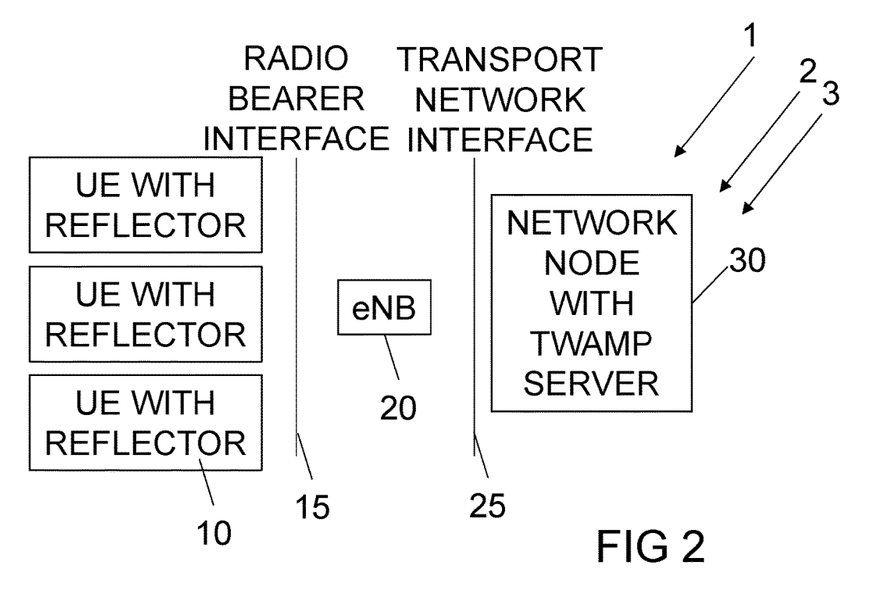
FIG. 2 illustrates a TWAMP architecture in a telecommunication network.

FIG. 2 illustrates schematically an embodiment based on an EPS architecture. A communication network 1, e.g. a packet-switched network 2, in this particular embodiment an EPS network 3 comprises a number of eNBs 20 to which UEs 10 are connected via a radio bearer interface 15. The Each UE 10 is pre-installed with a TWAMP reflector (or similar technology) to support active measurements. This can be implemented in the Android or iOS systems for example.

A Network Node 30 is installed with a TWAMP server, or similar technology, for scheduling and triggering of active measurement. The Network Node 30 could for example be a P-GW, S-GW or MME. The Network Node 30 communicates with the eNB 20 over a transport network interface 25.

The eNB 20, or future advancements of such base stations, is in this embodiment equipped with functionality for establishing and sensing whether the radio bearer is up or down and what QCI is chosen. This information should be communicated to the network node 30 that executes the TWAMP controller or other active measurement technology. The radio bearer status (e.g. "idle" or "connected") must be known or at least obtainable by the network node 30 executing the control function of the active measurement protocol, e.g. the TWAMP controller.

Figure 3A:
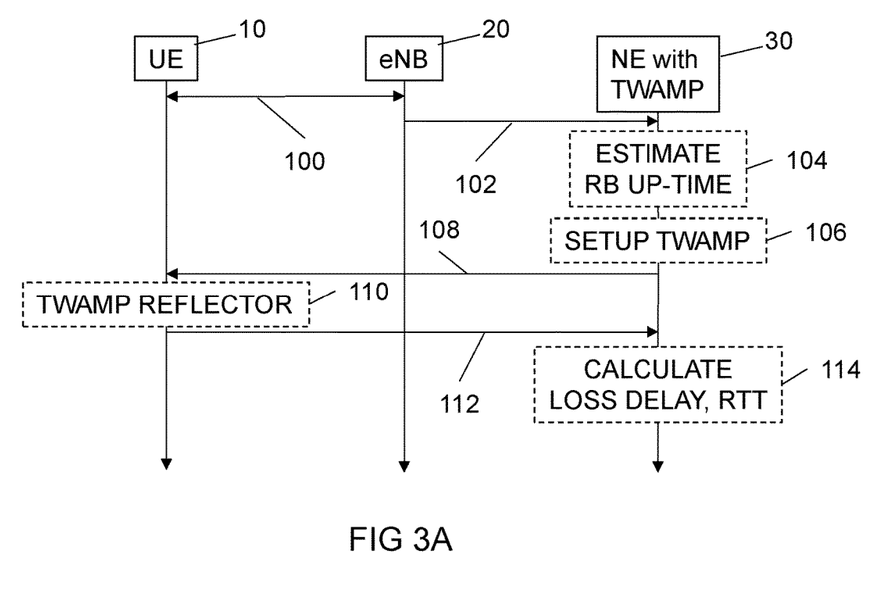
FIG. 3A illustrates interaction between UE, eNB and any NE with TWAMP capabilities.

FIG. 3A depicts the logical communication and actions performed by the UE 10, eNB 20 and the Network Element (NE) 30, i.e. the interaction between the UE, eNB and the NE. The UE 10 or the eNB 20 activates 100 the radio bearer for incoming or outgoing traffic. That is the UE 10 goes from the IDLE state to CONNECTED state. As the UE 10 goes from IDLE to CONNECTED state the eNB 20 informs 102 the NE 30 that the radio bearer and its associated QCI to a specific UE is up. The signaling 102 may pass additional nodes such as the MME or the P-GW. Observe that the activating node, the UE or the eNB only are examples of activating actors.

The NE 30 estimates 104 in the present embodiment the minimum time the radio bearer will be up. This value can for example be pre-set by the operator. NE 30 then prepares 106 the TWAMP session. TWAMP test packets are sent 108 to the UE 10. The UE TWAMP reflector receives 110 the TWAMP test packet. It also performs all necessary time stamping.

The TWAMP test packet is returned 112 to the NE 30. The steps 108, 110 and 112 may be repeated for a number of time units and in accordance to the TWAMP settings prepared in 106. NE 30 calculates 114 performance metrics based on the TWAMP test session.

The proposed technology may be applied to a user equipment, which may be a wired or wireless device. As used herein, the non-limiting term "User Equipment" may refer to a mobile phone, a cellular phone, a Personal Digital Assistant, PDA, a smart phone, a laptop or Personal Computer, PC, a tablet PC with communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with communication capabilities or the like. In particular, the term "UE" should be interpreted as a non-limiting term comprising any type of device communicating with a network node in a communication system or any device equipped with circuitry for communication according to any relevant standard for communication within a communication system. As used herein, the term "wired device" may refer to any device configured or prepared for wired connection to a network. "Wired device" also comprises optically wired devices. In particular, the wired device may be at least some of the above devices, with or without radio communication capability, when configured for wired connection.

As used herein, the non-limiting term "network element" or "network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like. The network element may also refer to different kinds of network elements within wired communication networks. The term "network element" should be interpreted according to the operations that are performed. The actual implementation could be made in one physical unit, optionally together with other functionalities, or in a distributed manner in more than one unit, communicating with each other.

The UE and the network element may also include radio circuitry for communication with one or more other nodes, including transmitting and/or receiving information.

Figure 3B:
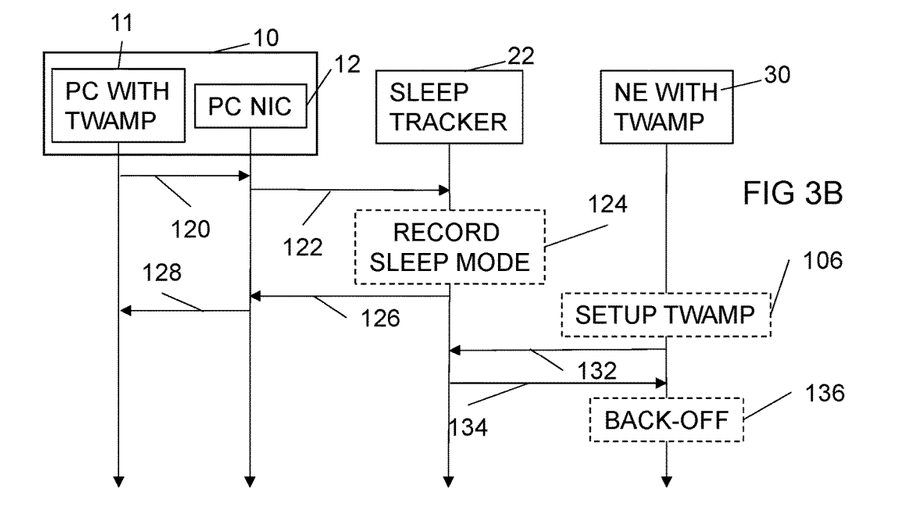
FIG. 3B illustrates interaction between PC, sleep tracker and any NE with TWAMP capabilities for a situation where the PC is in sleep mode.

FIG. 3B depicts the logical communication and actions performed by a UE 10 constituted by a PC 11 connected to a LAN. When the PC 11 intends to go into a sleep mode or some other inactive mode, a message 120 about this sis sent to the PC NIC 12. The PC NIC forwards a sleep mode message 122 to a sleep tracker 22, in which it is recorded 124 that the PC of a particular PC address is in a sleep mode. An acknowledgement 126 is sent back to the PC NIC, and is forwarded to the PC 11. When the NE 30 prepares 106 the TWAMP session, an investigation message 132 whether or not the PC is in a sleep mode is sent to the sleep tracker 22. The sleep tracker 22 retrieves the stored PC state and replies 134 with a message to the NE 30 that the PC of the requested PC address is in a sleep mode. The TWAMP session is therefore not suitable to perform and the NE 30 backs off 136 for a certain time before a new attempt is made.

If the PC is active, the sleep tracker has no records of the PC being in any sleep mode. This is the starting point of FIG. 3C. The NE 30 prepares 106 the TWAMP session. The investigation message 132 whether or not the PC is in a sleep mode is sent to the sleep tracker 22. Now, the sleep tracker 22 retrieves the stored PC state and replies 136 with a message to the NE 30 that the PC of the requested PC address is not in any sleep mode. The TWAMP session may therefore be continued. Test packets are sent 108 to the PC NIC 12 of the UE 10, and is forwarded 109 to the PC 11. The PC TWAMP reflector receives 110 the TWAMP test packet. It also performs all necessary time stamping.

Figure 3C:
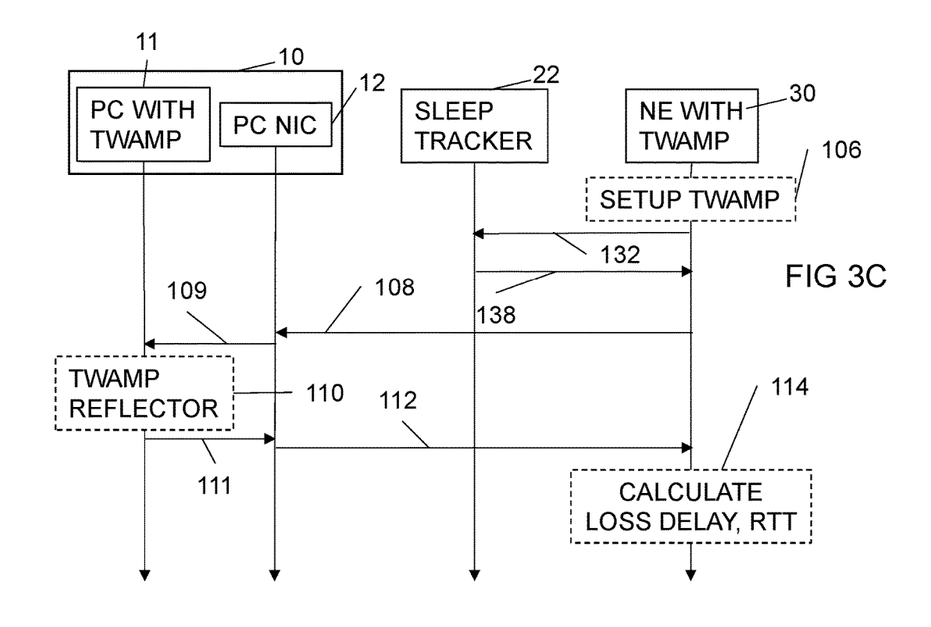
FIG. 3C illustrates interaction between PC, sleep tracker and any NE with TWAMP capabilities for a situation where the PC is not in sleep mode.

The TWAMP test packet is returned 111, 112 vi the PC NIC to the NE 30. The steps 108-112 may be repeated for a number of time units and in accordance to the TWAMP settings prepared in 106. NE 30 calculates 114 performance metrics based on the TWAMP test session.

The actual managing of the active measurements is performed in the network element preferably by a method performed by an admission control node enabling measurement between a first and a second device in a communication network. In short, such an embodiment of a managing method comprises determination of the connection status of the UE, i.e. if it is idle or active. It further involves trigger active measurements under certain conditions if the connection status is active. The method also includes ideas of backing-off and wait with active measurements until the connection status is active.

Figure 4:
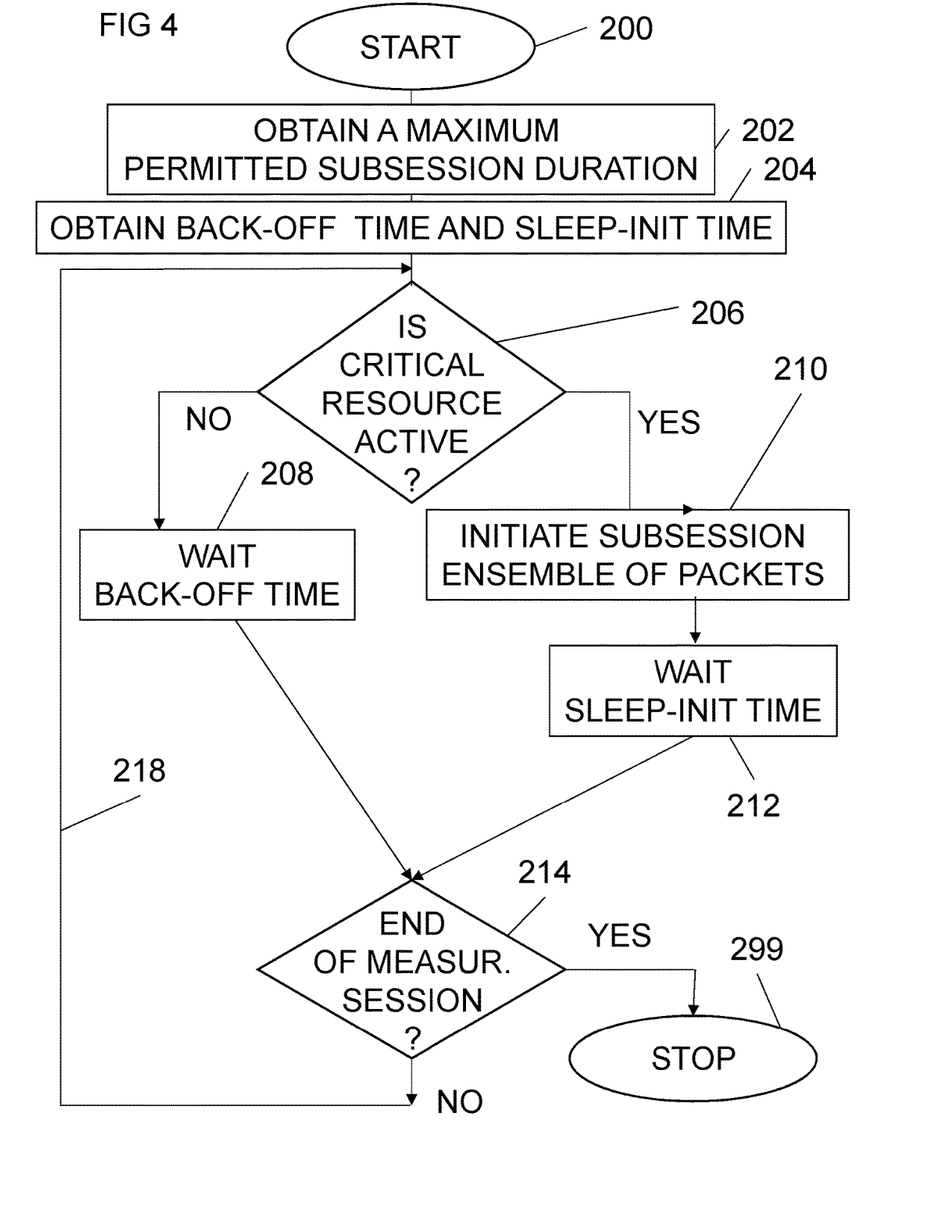
FIG. 4 is a flow diagram of an embodiment of a method for managing active measurements for determining performance parameters in a communication network.

An embodiment of a method for managing active measurements for determining performance parameters in a communication network can be illustrated by the flow diagram of FIG. 4. The method starts in step 200. In step 202, a maximum permitted subsession duration is obtained. This maximum permitted subsession duration may be established by the network element itself, or it can be received from any other network party. In step 204, time margins are also obtained. The time margins comprise at least a sleep-init time. This sleep-init time is intended to represent a duration sufficient to allow critical resources in the active measurements to enter into an inactive state if no other activities are present. The time margins may also comprise a back-off time. This back-off time is intended to represent a suitable waiting time between consecutive attempts to initiate an active measurement session. Also these time margins, the sleep-init time and the back-off time, if any, may be established by the network element itself, or it can be received from any other network party.

In step 206, it is determined whether or not at least a critical resource involved in the active measurement are active due to other activities than active measurements. In other words, it is concluded whether the resources for active measurements concerning a UE is idle or active. In a typical case, the critical resource is a radio bearer used for the active measurements or a computer targeted by the active measurements and connected through a local area network. The radio bearer is the typical main critical resource for a conventional cellular network implementation. In a local area network, it is the computer itself, or its battery capacity, that typically constitutes the main critical resource. This is further discussed below. If, in step 206, the determining step concluded that the critical resource involved in the active measurement is active due to other activities than active measurements, the process continues to step 210, where a sending of an ensemble of packets of a subsession of an active measurement session is initiated. Such subsession has a duration less than the maximum permitted subsession duration. The process flow then continues to step 212.

In the present embodiment, if the step 206 finds out that the path is inactive, the process flow continues to step 208. This embodiment assumes that the step of obtaining 204 time margins comprises obtaining of a back-off time. Step 208 then comprises waiting the back-off time before a new determining step 206 may be performed. This step is intended to avoid too frequent attempts to initiate an active measurement session, which otherwise could increase the control message load of the involved nodes.

In step 212, a waiting process is also performed. Here, the waiting time is controlled by the sleep-init time. This waiting time is intended to allow the critical resource to become inactive if no other activities than the active measurements are running.

After the waiting 212, it is determined in step 214 if the active measurement session has reached its end, if there is any intended next subsession of the active measurement session or not. If the measurement session is to be ended, i.e. if there is no intended next subsession of the active measurement session, the procedure is ended in step 299. If the measurement session is to be continued, i.e. if there is an intended next subsession of the active measurement session, the process continues back, as illustrated by the arrow 218, to step 206. In other words, if there is an intended next subsession of the active measurement session and if a time since a last ensemble of packets was sent exceeds the sleep-init time, at least the step of determining 206 and, if permitted, initiating 210 a sending of an ensemble of packets of the next subsession of the active measurement session is repeated 218.

It should be noticed that even if the embodiment of the method is illustrated as a flow of steps, some of the steps may be performed in different orders and/or overlapping. For instance, the step 202 may be performed at any time before the subsession is initiated. The maximum permitted subsession duration may also be updated intermittently. Likewise, the sleep-init time and/or the back-off time, step 204, can be obtain at any occasion before steps 212 and 208 are performed. The sleep-init time and/or the back-off time may also updated intermittently.

The admission control in a communication network is typically based on signaling overhead tradeoffs, the usage of scarce resources in the network and power consumption.

In a radio network, and in particular a macro radio network, the radio links are typically the most critical resource. The radio link can be activated/deactivated by activating/deactivating the radio bearer in the cellular network. Radio technologies that should be counted as the critical resource comprise 2G (GSM, GPRS, EDGE), 3G (W-CDMA, HSPA), LTE and WiMAX.

In a Wake-on-LAN application, the main critical resource can often be the PC/server itself. The server can be any physical machine such as an x86-based machine, a router and a switch. The server may even be a virtual machine running inside a hypervisor or container. A PC or server can operate in several states. One state is a sleep state, which is a power-saving state that allows for a computer to quickly go to sleep and then quickly resume full-power operations. All information is kept in memory but the mode consumes little power. Another state is hibernation, which is a power saving state mainly for laptops. In this case the information in the memory is put on the hard disk, then the computer is turned off. Resuming from this state is a bit slower, but the state is kept. The state "off" is when the PC is shut down in a traditional way. Finally, the state "on" is when the PC is in full-power operation.

In the Wake-on-LAN embodiment, the PC/server is in any of these states above. However, the network interface chip (NIC) is always operational and can wake the PC according to the magic packet concept. Depending on the PC state the awakening process takes different amount of time. Such awakening process or the interruption of any process intended to put the PC/server in a low-power consuming state should according to the technology presented above not be performed only for the sake of active measurements.

The embodiment above describes the functionality for triggering active measurements between a network element and the user equipment (UE) in a telecommunication network. When the UE communicates with the network, the corresponding radio bearer has to be active. This activity drains battery from the UE. Active measurements between a UE and a network element require an active radio bearer and if a radio bearer is active only for the purpose of active measurements, the battery is affected. The above described embodiment ensures that the operator-initiated measurements only are triggered when the radio bearer, or other link with scarce resources, is active due to other activities. That is, these ideas reduces the impact on the UE battery from active measurements. Further, it reduces the signaling overhead in the E-UTRAN by not activating radio bearers that will be used for measurements only.

A corresponding reasoning is valid for e.g. wake-on-LAN applications, where the CP/server itself may be considered as the critical resource.

In further embodiments, any critical resource of a communication system can be targeted in the same manner as described for the radio bearer above.

In order to optimize the benefits from these procedures, the parameters of maximum permitted subsession duration, sleep-init time and back-off time can be controlled or adapted to the actual signaling conditions. It is of benefit to use active measurement for a majority of the time the radio bearer or link is active for other activities. This means that the maximum permitted subsession duration should not be set too low. On the other hand, if the duration of the active measurement is too long, it may keep a radio bearer or link active for a longer period than necessary. If the conditions of the communication network is relatively constant, the duration can be optimized e.g. upon installation of the system. The maximum permitted subsession duration can thereby be controlled by a constant setup parameter in the communication network.

If the conditions vary between different UEs or different users, the maximum permitted subsession duration can be adapted individually e.g. for a specific type of UE, or even individually for each UE or user. These adapted settings of the maximum permitted subsession duration may be handled by the network element or any other node in the communication network. In other words, the maximum permitted subsession duration may in certain embodiments be set in dependence of a type of UE, for which the active measurements are to be performed. Also, the maximum permitted subsession duration may be set in dependence of a user, a UE of whom the active measurements are to be performed.

The type of sessions in a communication network may also vary drastically from time to time. Some of these variations may be correlated to the actual time, e.g. on if it is a working day or a weekend, if it is during the day or the night etc. Therefore, the maximum permitted subsession duration may in certain embodiments be set in dependence of the time of the day and/or the day of the week.

Since it is unfavorable to have large quantities of active measurements going on after an actual communication session for other purposes is ended, it is of benefit to restrict the maximum permitted subsession duration in comparison with the expected duration of other activities. In a communication network that is a packet-switched communication network, the maximum permitted subsession duration may in certain embodiments therefore be set in dependence on an expected packet session duration. In a particular embodiment, the maximum permitted subsession duration can be set to be lower than a statistical expectation value of packet session duration.

In a particular example, just to explain how an adjustment to the actual circumstances can be made, it has been decided from resource and accuracy considerations that an ensemble of packets in this particular example should contain 10 packets for RTT measurements. The time difference between the individual packets is then preferably approximately equal to an expected or estimated RTT. The duration of the entire ensemble of packets then becomes about ten times the RTT. If the expected RTT is 3 ms, the maximum permitted subsession duration can in this particular example be set to 30 ms or slightly more.

Also the sleep-init time and/or the back-off time has impact on the efficiency of the managing of active measurements. A too long sleep-init time and/or back-off time will generally decrease the number of active measurements, which gives a smaller base of data for determining the signaling conditions. A too short sleep-init time on the other hand may in some cases increase the risk of not allowing the UE to go into an idle or sleeping mode even if the actual "other activity" has ended. If the conditions of the communication network is relatively constant, the sleep-init time and/or the back-off can be optimized e.g. upon installation of the system. The sleep-init time and/or the back-off time can thereby be controlled by a constant setup parameter in the communication network.

As in the case of the maximum permitted subsession duration, also the optimum sleep-init time and/or the back-off time can be very different from UE to UE. In a particular embodiment, the sleep-init time and/or the back-off time may be set in dependence of a type of UE, for which the active measurements are to be performed. Also, in a particular embodiment, the time of the day and the day of the week may have importance, in particular the time it takes for de-activate different links or nodes in the network. Therefore, in a particular embodiment, the sleep-init time and/or the back-off time may be set in dependence of the time of the day and/or the day of the week.

In a particular embodiment, the sleep-init time and/or the back-off time, and in particular the sleep-init time, is set in dependence on an expected time for a first element or link in the path which is the object of the active measurement to be deactivated. In a particular embodiment, the sleep-init time and/or the back-off time, and in particular the sleep-init time, is set to be higher than an expected time for a type of UE, for which the active measurements are to be performed, to be entered into a sleeping mode.

The sleep-init time and the back-off time may in a particular embodiment be the same, i.e. controlled by one and the same parameter. However, in alternative embodiments, the sleep-init time and the back-off time are set separately, preferably in order to fine tune the respective functions.

A particular example, in which a radio bearer is the critical resource, is described here in order to exemplify how an adjustment to the actual circumstances can be made. If a time between the end of traffic and the transfer of a radio bearer from "connected" to "idle" is known, either from parameter settings or from actual measurements, such information can be used for finding suitable values of the sleep-init time. In some systems, the time is controlled by an operator settable parameter. In this particular example, such a parameter is assumed to be set to 10 s. The sleep-init time should then be selected to be at least equal to the parameter, i.e. in the present example at least 10 s. Preferably, in order to allow inaccuracies in controlling, the sleep-init time could be set somewhat higher, e.g. 10-50% higher, i.e. in the present example 11-15 s.

The back-off time relates to how often the operator wants the measurements to be performed. In other words, if the measurements are not appropriate, for how long time will it be defendable to wait before a new attempt for measurements is made? This value is also dependent on the actual intension of the active measurements. During normal operation, one or a few measurements during an expected open time of a radio bearer might be suitable. However, in situations when looking for malfunctioning devices or during capacity mapping, the operator may instead select much more frequent measurements.

If estimated or measured values of a mean idle time of a radio bearer is available, the back-off time may be based on such knowledge. If a mean idle time is found to be 70 s, the back-off time may e.g. be set to 50% of this value, i.e. in this example 35 s, in a normal operation situation. More detailed information can also be useful. If, as a particular example, it is measured or estimated that 90% of the radio bearers are idle less than 30 s, the back-off time may e.g. be set to 30 s in a normal operation situation. One then knows that in average, multiple measurement investigations may be performed in about 10% of all cases. In a fault-localizing operation, a back-off time of 1-5 s might instead be suitable.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

The proposed technology provides a communication network node configured for managing active measurements for determining performance parameters, wherein the communication network node is configured to obtain a maximum permitted subsession duration, to obtain time margins, comprising at least a sleep-init time, and to determine whether or not at least a critical resource involved in the active measurement is active due to other activities than active measurements. The communication network node is further configured to initiate, if the determining concluded that the at least a critical resource involved in the active measurement is active due to other activities than active measurements, a sending of an ensemble of packets of a subsession of an active measurement session. The subsession has a duration less than the maximum permitted subsession duration. The communication network node is further configured to repeat, if there is an intended next subsession of said active measurement session and if a time since a last ensemble of packets was sent exceeds the sleep-init time, at least the determining and, if permitted, the initiating of an ensemble of packets of said next subsession of the active measurement session.

In a particular example, the communication network node comprises a processor and a memory, said memory comprising instructions executable by the processor, whereby the processor is operative to obtain a maximum permitted subsession duration, to obtain time margins, comprising at least a sleep-init time, and to determine whether or not at least a critical resource involved in the active measurement is active due to other activities than active measurements. The processor is further operative to initiate, if the determining concluded that said at least a critical resource involved in the active measurement is active due to other activities than active measurements, a sending of an ensemble of packets of a subsession of an active measurement session. The subsession has a duration less than the maximum permitted subsession duration. The processor is further operative to repeat, if there is an intended next subsession of said active measurement session and if a time since a last ensemble of packets was sent exceeds the sleep-init time, at least the determining and, if permitted, the initiating of a sending of an ensemble of packets of said next subsession of the active measurement session.

In a particular embodiment, the critical resource is a radio bearer and/or a computer connected through a local area network. In a further particular embodiment the critical resource is a radio bearer. In a further particular embodiment the critical resource is a computer connected through a local area network.

Figure 5:
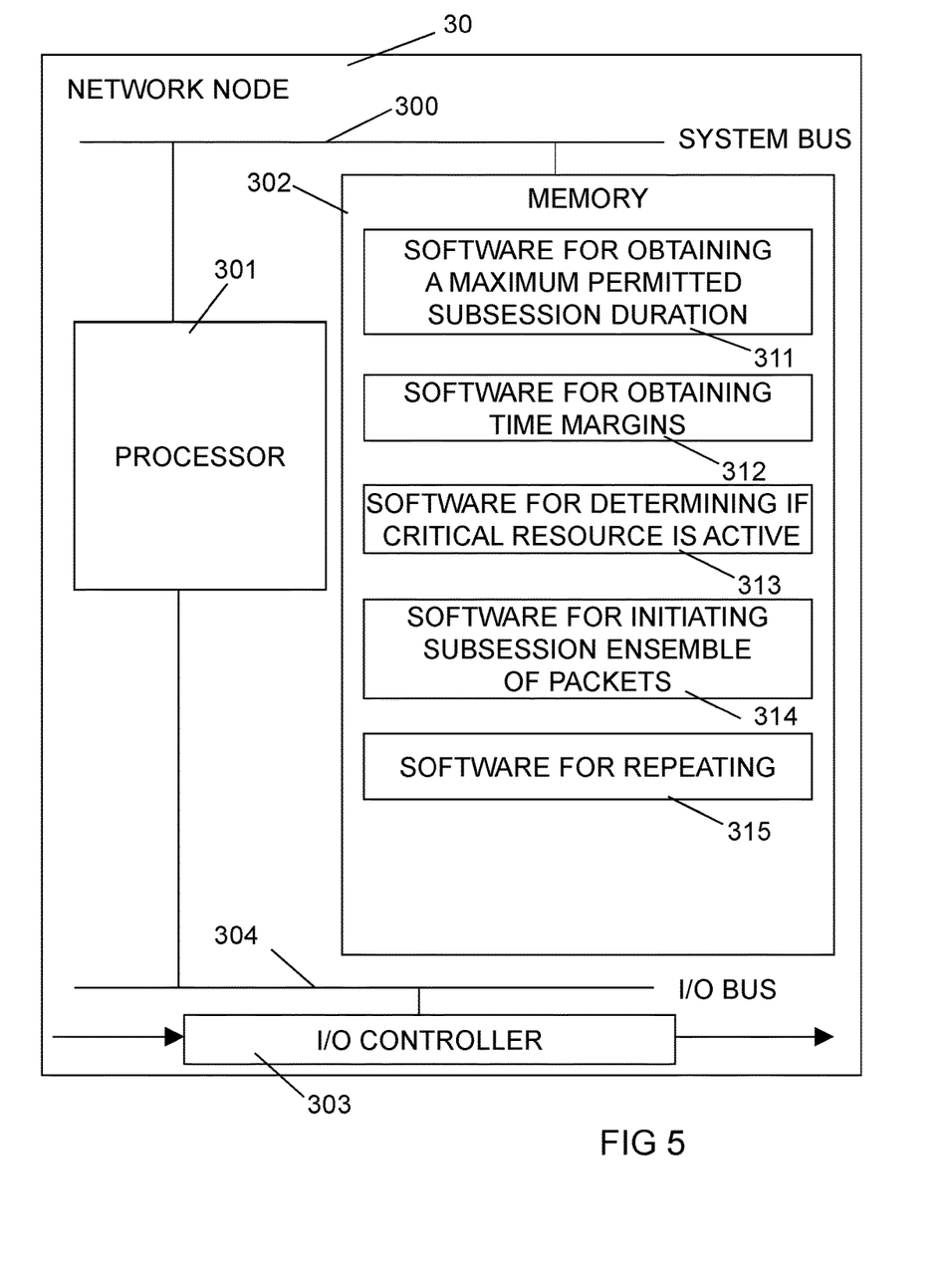
FIG. 5 is a block diagram of an embodiment of a network node operable for managing active measurements for determining performance parameters in a communication network.

In the following, an example of a computer implementation will be described with reference to FIG. 5. The communication network node 30 comprises processing circuitry such as one or more processors 301 and a memory 302. In this particular example, at least some of the steps, functions, procedures, modules and/or blocks described herein are implemented in a computer program, which is loaded into the memory 302 for execution by the processing circuitry 301. The processing circuitry 301 and memory 302 are interconnected to each other to enable normal software execution. In this embodiment, such interconnection is realized by a system bus 300. An optional input/output device may also be interconnected to the processing circuitry 301 and/or the memory 302 to enable input and/or output of relevant data such as input parameter(s) and/or resulting output parameter(s). In the present embodiment, this is illustrated by an I/O controller 303 and an I/O bus 304.

In the present embodiment, the memory 302 comprises software 311 for obtaining a maximum permitted subsession duration. As mentioned above, such obtaining may comprise receiving the maximum permitted subsession duration from elsewhere or an actual establishing of the maximum permitted subsession duration from other available parameters. In the present embodiment, the memory 302 further comprises software 312 for obtaining time margins. The time margins comprise at least a sleep-init time. As mentioned above, such obtaining may comprise receiving the time margins from elsewhere or an actual establishing of the time margins from other available parameters. In the present embodiment, the memory 302 further comprises software 313 for determining if the path and/or UE is active. In other words, the software is provided for determining whether or not at least a critical resource involved in the active measurement is active due to other activities than active measurements. In the present embodiment, the memory 302 further comprises software 314 for initiating subsession ensemble of packets if the critical resource is found to be active. In the present embodiment, the memory 302 further comprises software 315 for repeating the determination of any active critical resources.

The term 'computer' should be interpreted in a general sense as any system or device capable of executing program code or computer program instructions to perform a particular processing, determining or computing task.

In a particular embodiment, the instructions executable by the processor, causes the processor to be further operative to update the maximum permitted subsession duration intermittently.

In a particular embodiment, the instructions executable by the processor, causes the processor to be further operative to control the maximum permitted subsession duration by a constant setup parameter in the communication network.

In a particular embodiment, the instructions executable by the processor, causes the processor to be further operative to set the maximum permitted subsession duration in dependence of a type of UE, for which the active measurements are to be performed.

In a particular embodiment, the instructions executable by the processor, causes the processor to be further operative to set the maximum permitted subsession duration in dependence of a user, a UE of whom the active measurements are to be performed.

In a particular embodiment, the instructions executable by the processor, causes the processor to be further operative to set the maximum permitted subsession duration in dependence of the time of the day and/or the day of the week.

In a particular embodiment, where the communication network node is a packet-switched communication network node, the instructions executable by the processor, causes the processor to be further operative to set the maximum permitted subsession duration in dependence on an expected packet session duration.

In a particular embodiment, where the communication network node is a packet-switched communication network node, the instructions executable by the processor, causes the processor to be further operative to set said maximum permitted subsession duration to be lower than a statistical expectation value of packet session duration.

In a particular embodiment, the instructions executable by the processor, causes the processor to be further operative to update the sleep-init time and/or the back-off time intermittently.

In a particular embodiment, the instructions executable by the processor, causes the processor to be further operative to control the sleep-init time and/or the back-off time by a constant setup parameter in the communication network.

In a particular embodiment, the instructions executable by the processor, causes the processor to be further operative to set the sleep-init time and/or the back-off time in dependence of a type of UE, for which the active measurements are to be performed.

In a particular embodiment, the instructions executable by the processor, causes the processor to be further operative to set the sleep-init time and/or the back-off time in dependence of the time of the day and/or the day of the week.

In a particular embodiment, the instructions executable by the processor, causes the processor to be further operative to set the sleep-init time and/or the back-off time, and in particular the sleep-init time, in dependence on an expected time for a first element or link in the path which is the object of the active measurement to be deactivated. In a further particular embodiment, the instructions executable by the processor, causes the processor to be further operative to set the sleep-init time and/or the back-off time, and in particular the sleep-init time, to be higher than an expected time for a type of UE, for which the active measurements are to be performed, to be entered into a sleeping mode.

The computer or processing circuitry does not have to be dedicated to only execute the above-described steps, functions, procedure and/or blocks, but may also execute other tasks.

As indicated herein, the communication network element may alternatively be defined as a group of function modules. The function modules are typically implemented as a computer program running on at least one processor.

Figure 6:
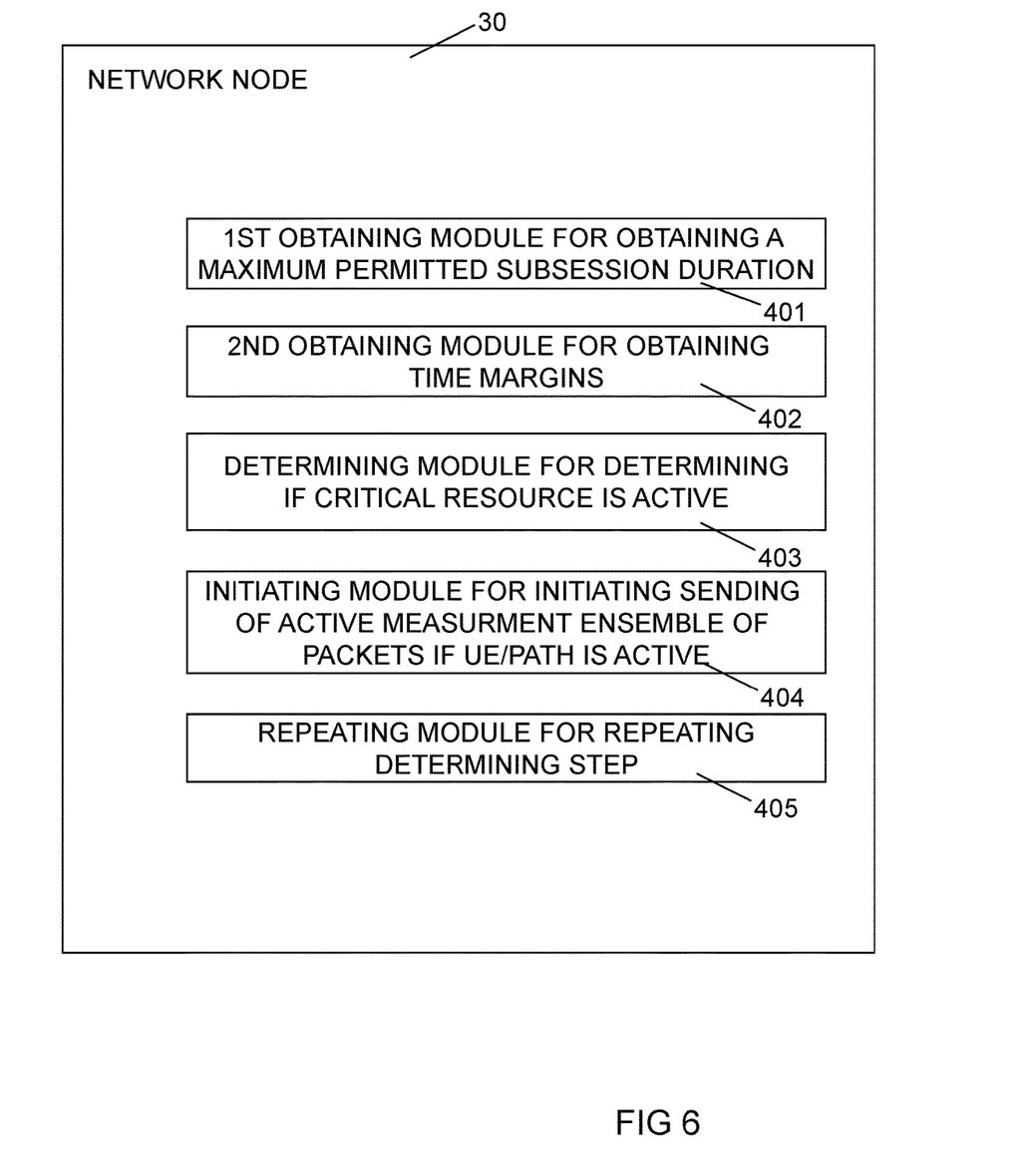
FIG. 6 is an illustration of a network node with modules capable of managing active measurements for determining performance parameters in a communication network.

FIG. 6 is a schematic block diagram illustrating an embodiment of an example of a communication network node 30. The communication network node 30 typically comprises a processor and an associated memory.

The computer program residing in memory may thus be organized as appropriate function modules configured to perform, when executed by the processor, at least part of the steps and/or tasks described herein. An example of such function modules is illustrated in FIG. 6.

FIG. 6 is thus a schematic block diagram illustrating an example of a network node 30 comprising a group of function modules. The communication network node 30 is configured for managing active measurements for determining performance parameters. The network node 30 comprises a first obtaining module 401 for obtaining a maximum permitted subsession duration. The network node 30 further comprises a second obtaining module 402 for obtaining time margins. The time margins comprise at least a sleep-init time. The network node 30 further comprises a determining module 403 for determining whether or not at least a critical resource involved in the active measurement is active due to other activities than active measurements. The network node 30 further comprises an initiating module 404 for initiating, if said determining step concluded that said at least a critical resource involved in said active measurement is active due to other activities than active measurements, a sending of an ensemble of packets of a subsession of an active measurement session. The subsession has a duration less than the maximum permitted subsession duration. The network node 30 further comprises a repeating module 405 for repeating, if there is an intended next subsession of said active measurement session and if a time since a last ensemble of packets was sent exceeds the sleep-init time, at least the determining and, if permitted, the initiating of a sending of an ensemble of packets of the next subsession of the active measurement session.

In a particular embodiment, the computer program comprises instructions, which when executed by at least one processor, cause the processor(s) to perform the function described above. In particular, computer program, residing in a memory, comprises program code, which when executed by a processing circuitry causes the processing circuitry to obtain a maximum permitted subsession duration, to obtain time margins, the time margins comprise at least a sleep-init time, and to determine whether or not at least a critical resource involved in the active measurement is active due to other activities than active measurements. The computer program comprises further program code, which when executed by a processing circuitry causes the processing circuitry to initiate, if the determining step concluded that said at least a critical resource involved in the active measurement is active due to other activities than active measurements, a sending of an ensemble of packets of a subsession of an active measurement session. The subsession has a duration less than the maximum permitted subsession duration. The computer program comprises further program code, which when executed by a processing circuitry causes the processing circuitry to repeat, if there is an intended next subsession of said active measurement session and if a time since a last ensemble of packets was sent exceeds the sleep-init time, at least the determining and, if permitted, the initiating of a sending of an ensemble of packets of said next subsession of the active measurement session.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

The software or computer program may thus be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Blueray disc, a Universal Serial Bus, USB, memory, a Hard Disk Drive, HDD storage device, a flash memory, a magnetic tape, or any other conventional memory device. The computer program may thus be loaded into the operating memory of a computer or equivalent processing device for execution by the processing circuitry thereof.

In particular, a computer program product comprises a computer-readable medium on which a computer program is stored. The computer program comprises program code, which when executed by a processing circuitry causes the processing circuitry to obtain a maximum permitted subsession duration, to obtain time margins, the time margins comprise at least a sleep-init time, and to determine whether or not at least a critical resource involved in the active measurement is active due to other activities than active measurements. The computer program further comprises program code, which when executed by a processing circuitry causes the processing circuitry to initiate, if the determining step concluded that said at least a critical resource involved in the active measurement is active due to other activities than active measurements, a sending of an ensemble of packets of a subsession of an active measurement session. The subsession having a duration less than the maximum permitted subsession duration. The computer program further comprises program code, which when executed by a processing circuitry causes the processing circuitry to repeat, if there is an intended next subsession of said active measurement session and if a time since a last ensemble of packets was sent exceeds the sleep-init time, at least the determining and, if permitted, the initiating of a sending of an ensemble of packets of said next subsession of the active measurement session.

In the example illustrated above, the connection status concerns the radio bearer status in an LTE system. This is one important application where the principles have been proved to operate well, however, the general ideas are also applicable in more general cases. One example that has been indicated above is a Wake-on-LAN system. The connections status investigated in such a case can e.g. be the power status of a UE in the wake-on-LAN scenario.

In the Wake-on-LAN embodiment, a TWAMP controller, or any other type of active measurement technology, needs to sense whether the reflector node is awake or if it is in sleep mode. The controller node can sense the status of the reflector node by for example adding a centralized entity that keeps track of sleeping and active nodes. In this case it is assumed that the node going to sleep informs the centralized entity beforehand. The process is then simply applied according to the general ideas above, which results in that no TWAMP packets will be transmitted if the reflector node is in sleep mode. The TWAMP session will be initiated only if the reflector node is awake.

Once the active measurements are performed, the measurements can be further used for classifying purposes. The TWAMP controller collects measurement data from sessions towards different UEs. Based on the received ensemble of packets, performance metrics can be calculated.

In a particular embodiment using a 3GPP approach, for each UE the measurement results are further classified based on the radio bearer QCI that was used during the measurement. For example, for a specific UE the measurement results would be as presented in Table 1.

TABLE 1

Measurement Result Collector table created for each UE.

| Bearer ID | ID1 | ID2 | ... | IDn |
|---|---|---|---|---|
| QCI | QCI1 | QCI1 | ... | QCIn |
| RTT | RTT1 | RTT2 | ... | RTT4 |
| Loss | Loss1 | Loss2 | ... | Loss4 |

To create this measurement result table the Measurement Result Collector (MRC) entity can be implemented in the same network element as the TWAMP controller to access which radio bearer and its associated QCI is active between a specific UE and eNB. The MRC is fed with performance data from the TWAMP controller. The MRC and the TWAMP controller can preferably be located in the same node, however, other solutions are also possible. The MRC reads the radio bearer QCI information for the specific UE-eNB connection. The MRC keeps the database of tables for each UE. It is updated for each new measurement result. Note that the elements in the table that are filled in depend on what actions the UE performs. If the UE for example mainly do Internet surfing then column QCI 8 is filled in.

Thus, this extension describes a part method for correlating measurement results with the QCI of the radio bearers for a given UE. Measurement samples are only obtained for the actual QCIs used by the UE and hence the number of measurements performed can be reduced.

In an embodiment of a method in a network node of a packet-switched communication network, performing active measurements, the network node receives the ensembles of packets of subsessions reflected at a user equipment. The received ensemble of packets are classified based on radio bearer QCI of the radio bearer used for the sending and receiving. In a particular embodiment, performance metrics are calculating per QCI based on said received ensemble of packets.

As above, the functionalities are in certain embodiments implemented as computer program code. In a particular embodiment, where the communication network node is a packet-switched communication network node, the instructions of the program code executable by the processor, causes the processor to be further operative to receive an ensemble of packets of a subsession reflected at a user equipment, and to classify the received ensemble of packets based on radio bearer QCI of the radio bearer used for the sending and receiving. In a further embodiment, the instructions executable by the processor, causes the processor to be further operative to calculate performance metrics per QCI based on the received ensemble of packets.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATION

ASIC Application Specific Integrated Circuit
BTS Base Transceiver Stations
CD Compact Disc
CPE Customer Premises Equipment
DSP Digital Signal Processor
DVD Digital Versatile Disc
EDGE Enhanced Data rates for Global Evolution
eNB E-UTRAN Node B
EPC Evolved Packet Core
EPS Evolved Packet System
E-UTRAN Evolved Universal Terrestrial Radio Access Network
FPGA Field Programmable Gate Array
GPRS General Packet Radio Services
GSM Global System for Mobile communication
HDD Hard Disk Drive
HSPA High-Speed Packet Access
HSS Home Subscriber Server
ICMP Internet Control Message Protocol
IETF Internet Engineering Task Force
IP Internet Protocol
IPPM IP Performance Metrics
LAN Local Area Network
LEE Laptop Embedded Equipment
LME Laptop Mounted Equipment
LTE Long-Term Evolution
MAC Media Access Control
MEP Measurement EndPoint
MIP Measurement Intermediate Point
MME Mobility Management Entity
MPLS MultiProtocol Label Switching
MPLS-TP MPLS-Transport Profile
NIC Network Interface Card
NE Network Element
OSI Open Systems Interconnection
OWAMP One-Way Active Measurement Protocol
PC Personal Computer
PDA Personal Digital Assistant
P-GW Packet Data Network Gateway
PLC Programmable Logic Controller
QCI QoS Class Identifier
QoS Quality of Service
RB Radio Bearer
RAM Random Access Memory
ROM Read-Only Memory
RRU Remote Radio Units
RTT Round Trip Time
S-GW Serving Gateway
SLA Service Level Agreement
TCP Transmission Control Protocol
TWAMP Two-Way Active Measurement Protocol
UE User Equipment
USB Universal Serial Bus
W-CDMA Wideband Code Division Multiple Access

The invention claimed is:

1. A method for managing active measurements between nodes in a communication network for determining performance parameters in the communication network, the method comprising the steps of:
obtaining a maximum permitted subsession duration;
obtaining time margins, said time margins comprising a sleep-init time, wherein said sleep-init time represents a duration to allow respective critical resources in active measurements to enter into an inactive state when no other activities are present;
determining whether or not at least a critical resource involved in said active measurement is active due to the other activities than active measurements;
initiating, when said determining step concluded that said at least a critical resource involved in said active measurement is active due to the other activities than active measurements, a sending of an ensemble of packets of a subsession of an active measurement session, wherein said at least a critical resource is at least one of a radio bearer used for active measurements and a computer targeted by active measurements and connected through a local area network,
said subsession having a duration less than said maximum permitted subsession duration; and
repeating, when there is an intended next subsession of said active measurement session and when a time since a last ensemble of packets was sent exceeds said sleep-init time, at least said step of determining and, when permitted, initiating a sending of an ensemble of packets of said next subsession of said active measurement session, wherein said step of repeating, when the time since the last ensemble of packets was sent exceeds said sleep-init time, allows said at least a critical resource to become inactive when no other activities than active measurements are present, and wherein allowing said at least a critical resource to become inactive when no other activities than active measurements are present facilitates reduction in power consumption of a user equipment due to active measurements.

2. The method according to claim 1, wherein said step of obtaining time margins further comprises obtaining a back-off time, whereby said method comprises the further step of:
waiting, when said determining step concluded that said at least a critical resource involved in said active measurement is not active due to the other activities than active measurements, for said back-off time before a new said determining step is performed.

3. The method according to claim 1, wherein said maximum permitted subsession duration is updated intermittently.

4. The method according to claim 1, wherein said maximum permitted subsession duration is controlled by a constant setup parameter in said communication network.

5. The method according to claim 2, wherein at least one of said sleep-init time and said back-off time is updated intermittently.

6. The method according to claim 2, wherein at least one of said sleep-init time and said back-off time is controlled by a constant setup parameter in said communication network.

7. The method according to claim 1, wherein said communication network is a packet-switched communication network and the method further comprises the steps of:
receiving an ensemble of packets of a subsession reflected at the user equipment; and
classifying said received ensemble of packets based on the radio bearer used for said sending and receiving.

8. The method according to claim 7, wherein said step of classifying comprises classifying said received ensemble of packets based on radio bearer quality of service class identifier of the radio bearer used for said sending and receiving.

9. The method according to claim 7, comprising the further step of:
calculating performance metrics based on said received ensemble of packets.

10. A communication network node configured for managing active measurements for determination of performance parameters, the communication network node comprising an input, an output, a processor, and a memory, said memory comprising instructions executable by said processor, whereby said processor is operative to:
obtain a maximum permitted subsession duration;
obtain time margins, said time margins comprising a sleep-init time, wherein said sleep-init time represents a duration to allow respective critical resources in active measurements to enter into an inactive state when no other activities are present;
determine whether or not at least a critical resource involved in said active measurement is active due to the other activities than active measurements;
initiate, when said determination concluded that said at least a critical resource involved in said active measurement is active due to the other activities than active measurements, to send an ensemble of packets of a subsession of an active measurement session, wherein said at least a critical resource is at least one of a radio bearer used for active measurements and a computer targeted by active measurements and connected through a local area network,
said subsession having a duration less than said maximum permitted subsession duration; and
repeat, when there is an intended next subsession of said active measurement session and when a time since a last ensemble of packets was sent exceeds said sleep-init time, at least said determination and, when permitted, initiation to send an ensemble of packets of said next subsession of said active measurement session, wherein the repetition, when the time since the last ensemble of packets was sent exceeds said sleep-init time, allows said at least a critical resource to become inactive when no other activities than active measurements are present, and wherein allowance of said at least a critical resource to become inactive when no other activities than active measurements are present facilitates reduction in power consumption of a user equipment due to active measurements.

11. The communication network node according to claim 10, wherein said instructions executable by said processor, cause said processor to be further operative to obtain a back-off time and to wait, when said determination concluded that said at least a critical resource involved in said active measurement is not active due to the other activities than active measurements, for said back-off time before a new said determination is performed.

12. The communication network node according to claim 10, wherein said instructions executable by said processor, cause said processor to be further operative to update said maximum permitted subsession duration intermittently.

13. The communication network node according to claim 10, wherein said instructions executable by said processor, cause said processor to be further operative to control said maximum permitted subsession duration by a constant setup parameter in a communication network of said communication network node.

14. The communication network node according to claim 11, wherein said instructions executable by said processor, cause said processor to be further operative to update at least one of said sleep-init time and said back-off time intermittently.

15. The communication network node according to claim 11, wherein said instructions executable by said processor, cause said processor to be further operative to control at least one of said sleep-init time and said back-off time by a constant setup parameter in a communication network of said communication network node.

16. The communication network node according to claim 10, wherein said communication network node is a packet-switched communication network node and said instructions executable by said processor, cause said processor to be further operative to:
receive an ensemble of packets of a subsession reflected at the user equipment; and
classify said received ensemble of packets based on the radio bearer used to send and receive.

17. The communication network node according to claim 16, wherein said instructions executable by said processor, cause said processor to be further operative to classify said received ensemble of packets based on radio bearer quality of service class identifier of the radio bearer used to send and receive.

18. A computer-readable storage medium on which a computer program is stored, wherein the computer program comprises program code, which when executed by a processing circuitry causes the processing circuitry to:
obtain a maximum permitted subsession duration;
obtain time margins comprising a sleep-init time, wherein said sleep-init time represents a duration to allow respective critical resources in active measurements to enter into an inactive state when no other activities are present;
determine whether or not at least a critical resource involved in said active measurement is active due to the other activities than active measurements;
initiate, when said determination concluded that said at least a critical resource involved in said active measurement is active due to the other activities than active measurements, to send an ensemble of packets of a subsession of an active measurement session, wherein said at least a critical resource is at least one of a radio bearer used for active measurements and a computer targeted by active measurements and connected through a local area network,
said subsession having a duration less than said maximum permitted subsession duration; and
repeat, when there is an intended next subsession of said active measurement session and when a time since a last ensemble of packets was sent exceeds said sleep-init time, at least said determination and, when permitted, initiate to send an ensemble of packets of said next subsession of said active measurement session, wherein the repetition, when the time since the last ensemble of packets was sent exceeds said sleep-init time, allows said at least a critical resource to become inactive when no other activities than active measurements are present, and wherein allowance of said at least a critical resource to become inactive when no other activities than active measurements are present facilitates reduction in power consumption of a user equipment due to active measurements.

\* \* \* \* \*